United States Patent

Guth et al.

[11] 4,014,735
[45] Mar. 29, 1977

[54] CONCENTRATION AND SEPARATION OF CORROSIVE LIQUID MIXTURES

[75] Inventors: Hans Guth, Berg. Neukirchen; Hans-Joachim Kaiser; Klaus Kleine-Weischede, both of Leverkusen; Hermann Wieschen, Cologne, all of Germany; Hans L. Kühnlein, Fullinsdorf, Switzerland

[73] Assignees: HCH. Bertrams Aktiengesellschaft, Basel, Switzerland; Bayer Aktiengesellschaft, Leverkusen, Germany

[22] Filed: Aug. 15, 1975

[21] Appl. No.: 605,365

Related U.S. Application Data

[62] Division of Ser. No. 442,937, Feb. 15, 1974, Pat. No. 3,933,575.

[30] Foreign Application Priority Data

Mar. 6, 1973 Germany .......................... 2311085

[52] U.S. Cl. .................. 159/13 A; 159/14; 159/17 P; 159/17 VS; 159/28 R; 159/46; 159/DIG. 13; 159/DIG. 15; 159/DIG. 19; 159/DIG. 32; 23/306; 202/236; 202/235; 202/172; 165/140

[51] Int. Cl.² ............... B01D 1/22; B01D 3/00; B01D 1/00

[58] Field of Search ... 159/DIG. 19, 13 B, DIG. 13, 159/DIG. 15, DIG. 32, 13 A, 13 B, 49, 14, 17 P, 17 VS, 28 R, 46; 23/306; 423/531, 526; 165/140; 202/235, 236, 172

[56] References Cited

UNITED STATES PATENTS

| | | |
|---|---|---|
| 1,141,266 | 6/1915 | Raschig ...................... 159/DIG. 29 |
| 2,793,939 | 5/1957 | Haltmeier .................... 159/DIG. 15 |
| 3,004,590 | 10/1961 | Rosenblad ....................... 159/13 B |
| 3,106,515 | 10/1963 | Williams ..................... 159/DIG. 19 |
| 3,275,530 | 9/1966 | Akers .............................. 159/13 B |
| 3,294,650 | 12/1966 | Manteufel ................... 159/DIG. 15 |

Primary Examiner—Jack Sofer
Attorney, Agent, or Firm—Burgess, Dinklage & Sprung

[57] ABSTRACT

In the processing of a corrosive liquid mixture, such as 50 to 80% aqueous sulfuric acid, by its passage over one surface of a wall of inert heat resistant material, and heating the other surface of said wall, thereby to evaporate from said corrosive liquid mixture the more volatile component thereof, the improvement which comprises heating said wall by contact with an inert liquid material, and heating said inert liquid material indirectly through heat exchange with a normally solid molten material. Desirably the wall of inert material is a pipe surrounded by a molten metal in a first annular jacket and a molten salt in a second annular jacket.

4 Claims, 12 Drawing Figures

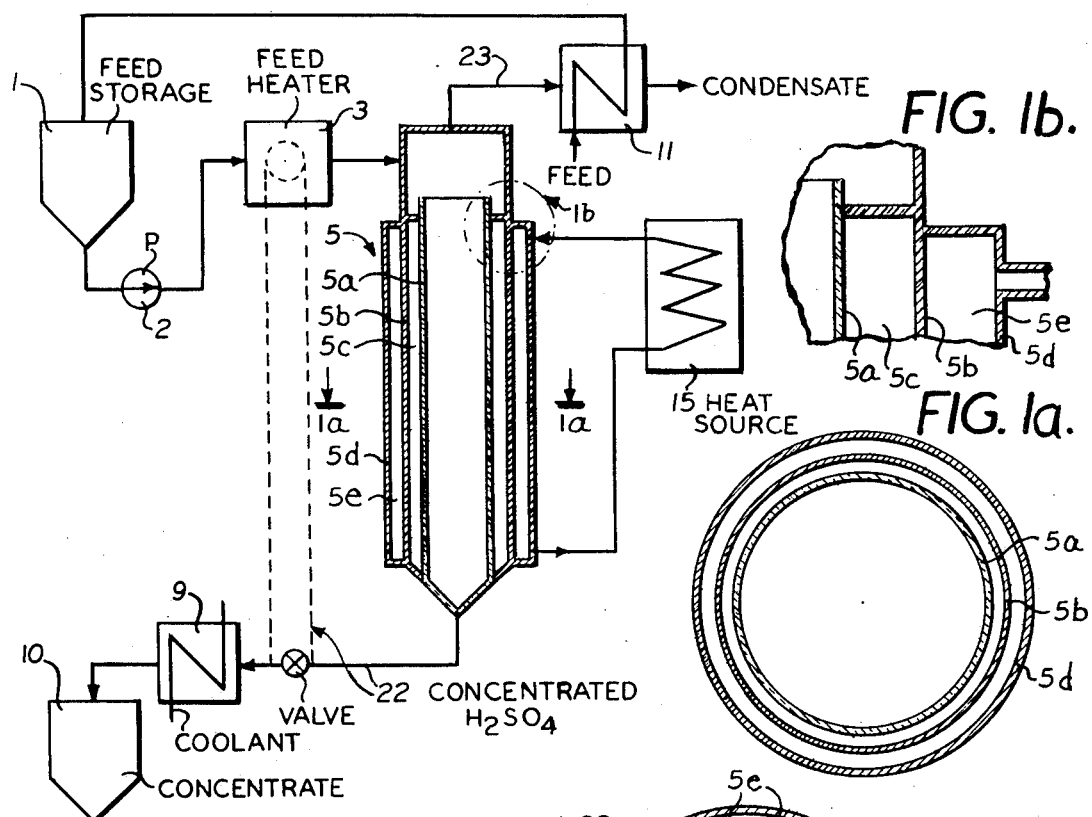
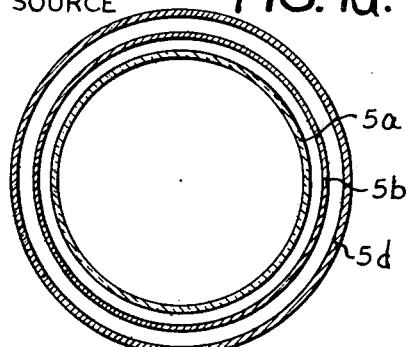
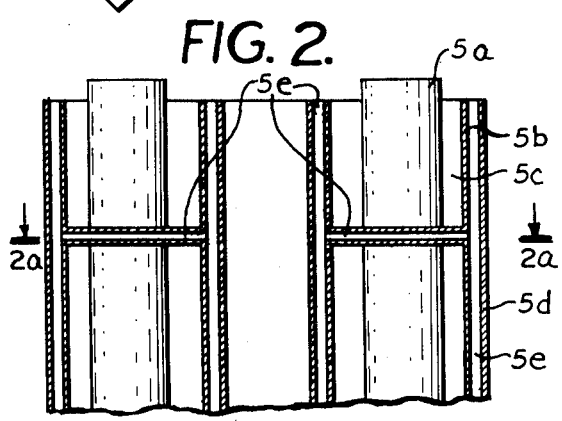
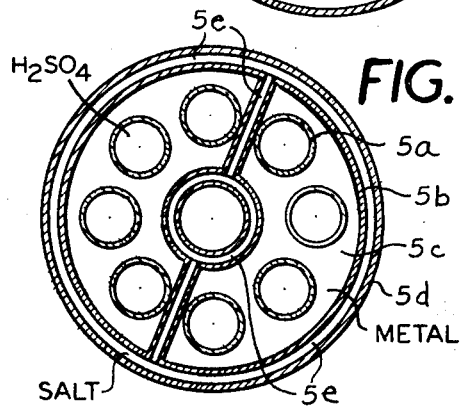
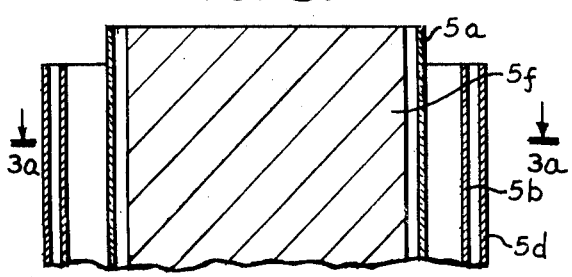
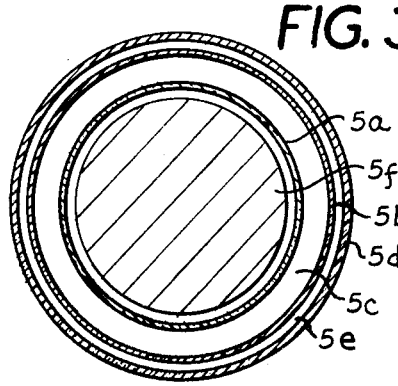

CONCENTRATION AND SEPARATION OF CORROSIVE LIQUID MIXTURES

This is a division of application Ser. No. 442,937, filed Feb. 15, 1974, now U.S. Pat. No. 3,933,575.

This invention relates to a process and to an apparatus for separating corrosive liquid mixtures into a vapor fraction and a liquid fraction under conditions of indirect heat supply.

In technical processes it is frequently necessary to separate, concentrate and/or purify liquid mixtures. Many different processes and apparatus have been proposed which differ according to the problems to be solved, but corrosive liquids or mixtures of substances which contain a corrosive component present quite special problems. These are mainly problems of heat transfer caused by the materials used for the apparatus. Materials used for apparatus which deal with corrosive liquids are either of the kind which jeopardize the efficiency of the process because of their heat transfer properties, or are of the kind which are so expensive that they cannot be used for plants dealing with large quantities of mixtures or, if used, would constitute a serious burden on investment costs. If, on the other hand, less resistant materials are used then both the operating costs are increased due to the frequent repairs required, and the operational safety and reliability are jeopardized due to the vessels corroding and becoming fragile.

Both in the hemical and other branches of industry the increasing capacity of plants results in ever increasing quantities of corrosive liquids having to be worked up, in order to return them to the process or to render them harmless. Apart from other acids and corrosive mixtures of substances, sulfuric acid poses a particulr problem since there are numerous processes in which it is not used up but in which it accumulates in a diluted and often heavily contaminated form in the course of the process.

Numerous processes have been proposed specifically for concentrating dilute sulfuric acid. The method of evaporation by direct heating with combustion gases is one which is used very frequently on a technical scale for concentrating sulfuric acid up to an average concentration of about 60% $H_2SO_4$ (U.S. Pat. No. 2,762,690; German Pat. No. 69,216; Chem. Eng. Progr. Vol. 43, No. 5 [1947] 225 – 236; German Specification DAS 1,162,502; German Pat. No. 1,131,193). Methods of direct heating with a hot gas are, however, less suitable for manufacturing highly concentrated acids because of the resulting air contamination.

Methods of indirect heating have been evolved particularly for concentrating sulfuric acid to more than 90%. Evaporation in these processes is generally carried out in vessels made of cast iron, but the vessels are not found to be sufficiently durable even if special alloys are used. Moreover, they cannot be built to a sufficiently large size and consequently for high outputs it is necessary to arrange numerous vessels in batteries (U.S. Pat. No. 2,172,058; Chem. Trade J. 108 [1941] 27 – 28, 43 – 44). The vessels are frequently equipped with rectifying columns (German Pat. No. 742,574; German Pat. No. 528,696). Even improved embodiments of this process suffer from low thermal efficiency and high acid losses if the final concentrations are raised to 95 to 98%. Moreover, at any one time relatively large quantities of hot acid are carried in the apparatus which is liable to break down unforeseeably due to corrosion.

Some of the difficulties mentioned above are obviated by methods of concentration which are carried out under vacuum. Numerous embodiments of vacuum processes have been disclosed, some of which were developed for a particular acid or salt concentration. With the so-called falling film evaporator (Chem. Eng. Progr. Vol. 43, No. 5 [1947] 291 – 224) which operates with a descending evaporating pipe of ferrosilicon, it is possible to achieve acid concentration of up to about 93% $H_2SO_4$. Another apparatus which has been proposed is the flash film concentrator in which the main evaporating zone is not situated in descending pipes but in horizontal pipes arranged behind one another and equipped with steam jackets. In Chem. Eng. Progr. loc. cit. 237 – 244 there is also described a process in which sulfuric acid is concentrated in batches at low pressures (about 23 mm Hg) to a final concentration of about 93%.

To avoid corrosion, it has also been proposed to use apparatus in which the vessels are made of quartz. The process according to U.S. Pat. No. 3,294,650 is also carried out under vacuum, and for relatively small outputs of acid an electrically heated quartz apparatus which may also be operated at normal pressure has been disclosed.

According to German Pat. No. 1,237,549 and Swiss Pat. No. 395,929, alkaline liquors can be concentrated in falling film evaporators which are heated with a salt melt. For well-known reasons, however, the methods described in these two patents cannot be applied directly to corrosive liquids or to liquid mixtures.

It is accordingly an object of the invention to provide a process and apparatus which can be used to separate corrosive liquid mixtures simply with safeguards against costly repairs in the event of minor wear on parts of system.

These and other objects are realized in accordance with the present invention which relates to the processing of a corrosive liquid mixture by its passage over one surface of a wall of inert heat resistant material, and heating the other surface of said wall, thereby to evaporate from said corrosive liquid mixture the more volatile component thereof. The improvement herein provided comprises heating said wall by contact with an inert liquid material, and heating said inert liquid material indirectly through heat exchange with a normally solid molten material.

Advantageously the wall over which the liquid is passed comprises a vertical pipe over one surface of which said corrosive liquid mixture passes, the inert liquid material being disposed in a first element in surrounding relationship relative to said pipe, and the molten material being disposed in a second element in surrounding relationship relative to said first element.

This method provides an operationally reliable and thermally efficient means of continually concentrating or separating highly corrosive substances or mixtures. Unwanted substances (impurities) can be removed at the same time. The process is particularly suitable for inorganic or organic acids and solvents. It is especially suitable for concentrating sulfuric acid, particularly for concentrating sulfuric acid already at a concentration of about 50 to 80% to a concentration of at least 94%. All parts of the apparatus exposed to the corrosive substances are made of a material which is absolutely or substantially resistant to corrosion. The materials used for these parts of the apparatus are preferably borosilicate glass or quartz, in particular quartz glass with a high degree of purity (99.9% $SiO_2$). The process operates at normal pressure so that expensive vacuum distillations are not necessary. If desired, the process may be carried out at a slight excess pressure of up to 5 atmospheres. In special cases it may be carried out in an inert gas atomsphere. By using an indirect heating system with a liquid heat carrier which is heated mainly with heavy oil, natural gas or any other inexpensive source of energy, the process operates with a high degree of thermal efficiency and at the same time the hot surfaces are uniformly heated. In the simplest embodiment of the process, the liquid which is to be treated is distributed over the wall of the pipe, the other side of which is heated with an inert melt, the inert melt being heated indirectly by circulating it through a heat generator. However for reasons of safety it is preferable to provide a small quantity of some other molten material which is inert towards the corrosive substances between the liquid heat carrier and the corrosive mixture which is to be separated. Since the evaporator pipe itself contains very little hot liquid, any unforseen trouble such as breakage of the evaporator pipe will not result in any complications too difficult to control.

The invention will be further described with reference to the accompanying drawings wherein:

FIG. 1 is a schematic illustration of one apparatus for carrying out the novel process;

FIG. 1a is a schematic horizontal sectional view through the jacketed pipe of FIG. 1;

FIGS. 2 and 2a are respectively vertical and horizontal sectional views through an alternative arrangement of enclosed pipes in accordance with the invention;

FIGS. 3 and 3a are similar views of still another embodiment;

Figure 4:
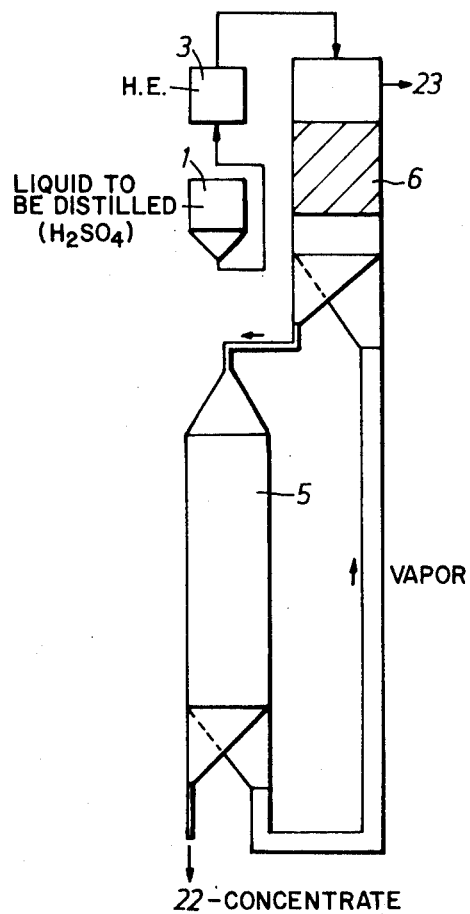
FIG. 4 is a schematic view of an apparatus including a falling flow evaporator in which vapors leave the pipe in cocurrent flow to the concentrated liquid.

The various reference numerals in the figures have the following meanings:

1 = storage vessel for the substance mixture which is required to be concentrated (dilute sulfuric acid)
2 = pump
3 = heat exchanger
4 = battery of evaporating stages
5 = evaporating stage
5a = evaporating pipe
5b = internal jacket
5c = stationary inert liquid or first melt
5d = external jacket
5e = circulating melt (second melt)
5f = displacement body
6 = distillation column, rectification column
6a = dilute sulfuric acid, e.g. 60 to 75%
6b = auxiliary substances, e.g. purification components
6c = pump
6d = distributing device
7 = storage vessel for auxiliary substances
8 = pump
9 = cooler for liquid fraction (e.g. concentrated sulfuric acid)
10 = storage vessel for liquid fraction
11 = heat exchanger, vapor condenser
11a = supplementary vapor condenser
12 = oil separator
13 = condensate
14 = oils condensed in separator 12
15 = heating installation for melt 5e)
16 = fuel oil
17 = combustion plant
18 = pipe system
19 = heat exchanger
20 = pressurizing device
21 = safety valve
22 = liquid fraction
22a = circulating pump for liquid fraction
23 = vapor fraction The figures illustrate only a few possible or preferred embodiments; others are, of course, possible within the scope of this invention, for example the inert melt may also be positively circulated. Furthermore, the inert melt may also be heated by means of heating coils or other heat exchanger elements dipping into the melt. Lastly, the arrangement according to FIGS. 1 and 1a may be modified so that the liquid which is required to be treated is in the external pipe and the circulating melt in the internal pipe.

According to FIG. 1, the liquid mixture which is required to be separated or liquid which is required to be concentrated is pumped from the storage vessel 1 into the heat exchanger 3 by the feed pump 2. In the heat exchanger 3 it is heated until it is close to its boiling point and it is then transferred into the evaporating stage 5 where it is finely divided in the evaporating pipe 5a and separated into a liquid phase 22 and vapor phase 23. The liquid fraction may give up some of its heat to heat the heat exchanger 3 and may then be further cooled in the cooler 9 before it enters the storage vessel 10. The vapor fraction 23 is cooled and condensed in the condenser 11. Thus the vapor fraction 23 is cooled by the inlet liquid stream. The heat exchanger 11 usually forms part of the heat exchanger 3. The internal jacket 5b contains an inert liquid, preferably a first melt, e.g. a molten metal, metal alloy or salt. This first melt which is used should be inert towards the mixture which is required to be concentrated and it should have a low melting point. The inert melt 5c is heated by a second melt circulating in the external jacket 5d, preferably to a temperature in the range of about 180° C to 550° C. The circulating melt used for heating is preferably a molten salt with a suitable melting point which is not too high. It is heated in the heating apparatus 15. The whole evaporator unit is heated to a temperature of about 50° C to 180° C with saturated steam.

Figure 6:
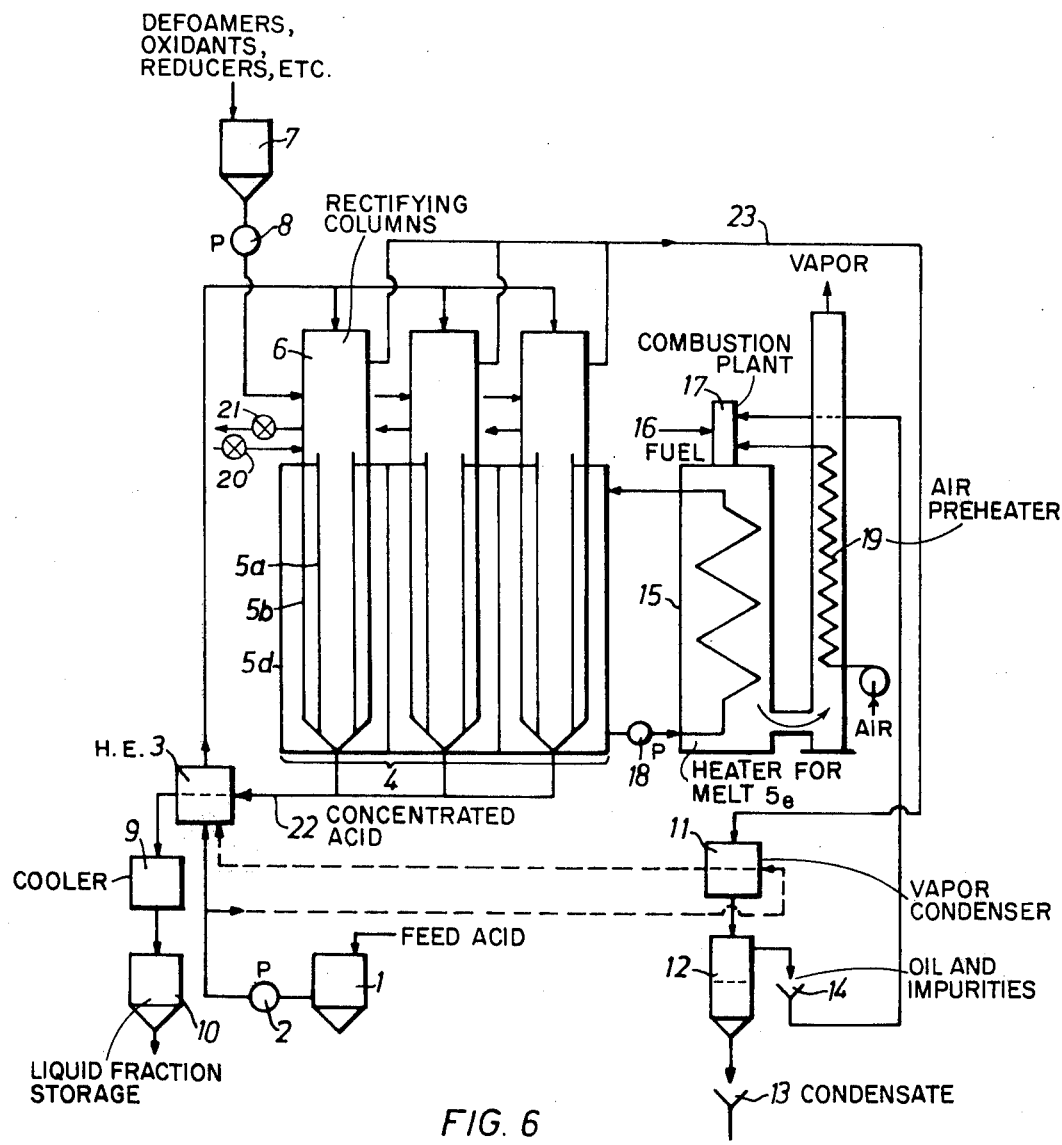
FIG. 6 shows a special embodiment for concentrating and purifying sulfuric acid.

The evaporating stage 5 may be composed of three concentric pipes of which the internal evaporating pipe 5a is made of a material which is resistant to the liquid to be concentrated, and preferably made of quartz glass. The internal and external jackets are generally made of metal, normally steel. As shown in FIG. 6, several evaporating pipes 5a each surrounded by an internal jacket pipe 5d may be connected in parallel and together heated with the circulating melt. Alternatively, several evaporating pipes 5a surrounded by internal jacket pipes 5b may be arranged in series and heated either separately or together.

Other possible arrangements for the evaporating stage are shown in FIGS. 2, 2a, 3 and 3a. FIGS. 2 and 2a show an evaporating stage in which the evaporating pipes 5a are together inserted in the safety melt 5c which is heated internally and externally with a circulating melt. FIGS. 3 and 3a show an arrangement of an evaporating stage which in principle is similar to that in FIG. 1 but with the difference that inside the evaporating pipe 5a is a displacement body over which the liquid to be treated may be arranged to trickle. This arrangement is suitable, for example, for climbing evaporators.

As shown in FIG. 6 to 9, the evaporating stage 5 is generally equipped with an evaporating column (rectifying column) 6 in which exchange of material and energy takes place between the vapors of the evaporating stage and the liquid which is to be concentrated. This rectifying column may be either a packed column or a bubble tray column. In the case of a bubble tray column, the various bubble trays may be made of differing materials, e.g. quartzware, borosilicate glass, cast iron or steel according to the thermal stresses to which they are subjected. A bubble tray column has the further advantage that individual vapor fractions can be removed separately from the process. Above the acid inlet is at least one rectifying tray where the condensed vapors are used to free the vapor mixtures from the acid vapors and droplets of liquid acid carried with them.

Evaporating stage 5 and rectifying column 6 can be arranged in relation to each other in various ways. The evaporating stage 5 may be operated by the direct flow or the counterflow process but in the rectifying column 6 only the counterflow principle of liquid to vapor phase is employed.

Figure 5:
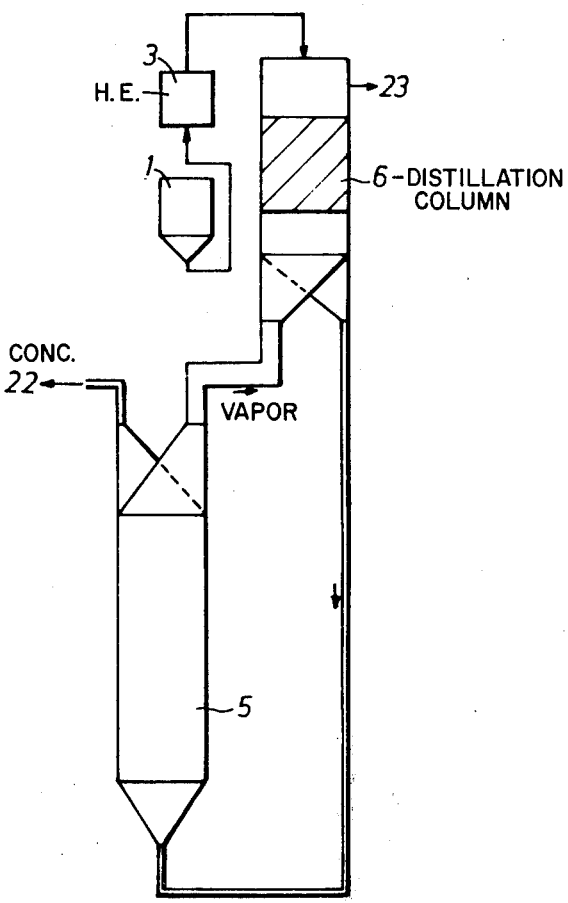
FIG. 5 is a schematic view of another embodiment wherein the evaporator pipe is in the form of a climbing film evaporator.
Figure 7:
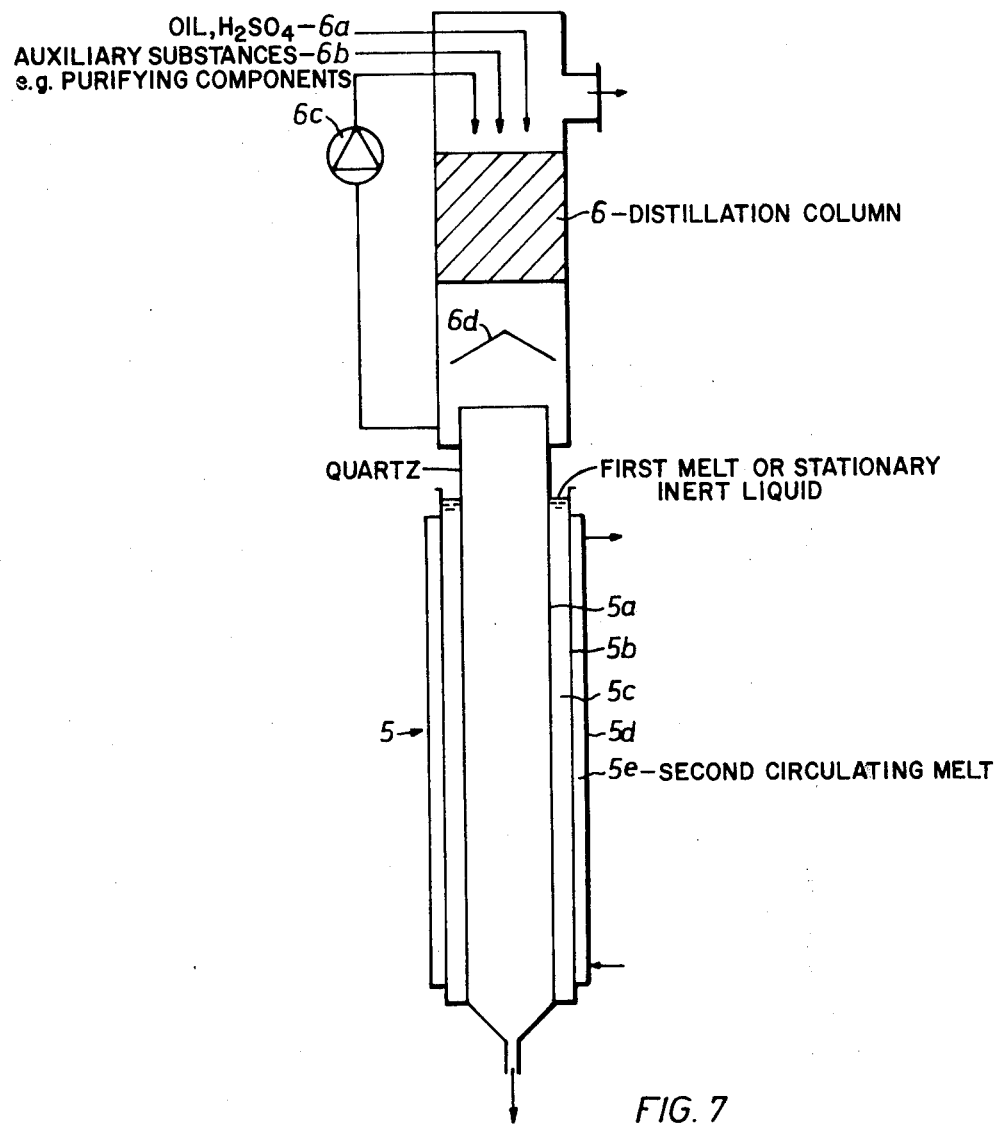
FIGS. 7, 8 and 9 show different embodiments of evaporating stage and attached column which may be used in the overall apparatus of FIG. 6.
Figure 8:
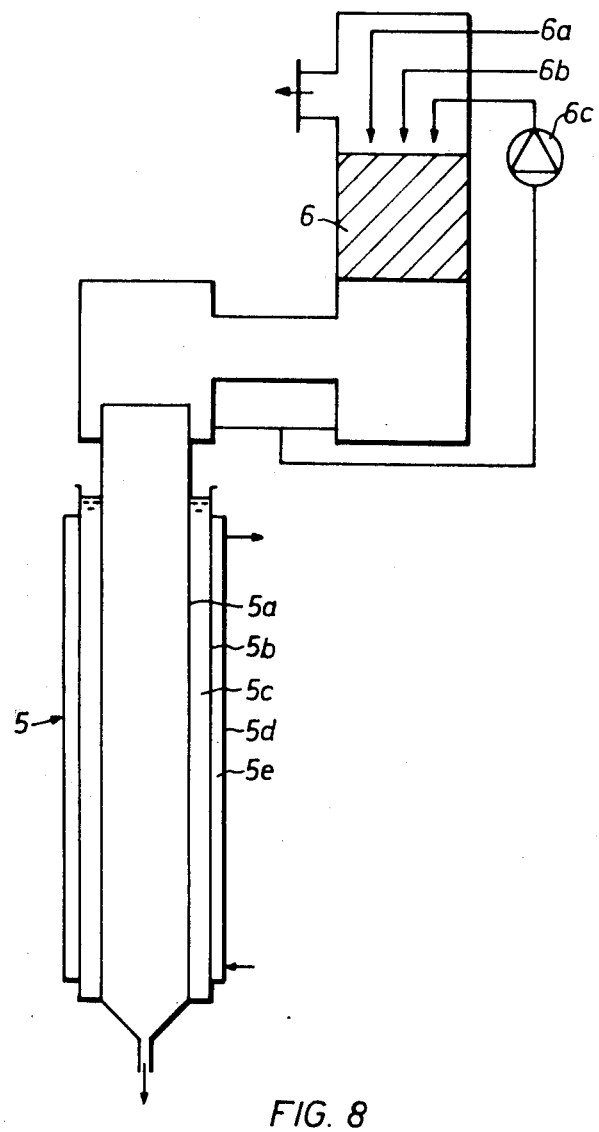
Figure 9:
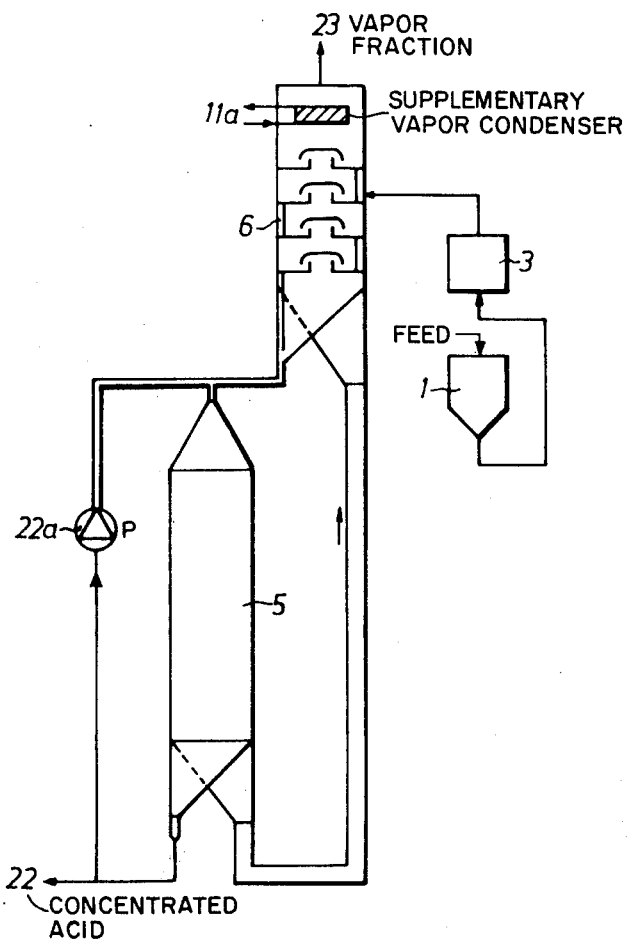

In FIG. 6 to 8, the evaporating unit operates by the counterflow process. In the arrangement of 5 and 6 shown in FIG. 8, a plurality of evaporating units 5 may be provided and the vapors introduced into a central rectifying column 6. FIGS. 4 and 9 show a variation of the process in which the vapors leave the evaporating stage 5 in the same direction as the liquid fraction. In the variation according to FIG. 9, the concentrated liquid fraction is circulated by a pump 22a. FIG. 5 shows the evaporating stage in the form of a climbing evaporator.

The application of the process to concentrating sulfuric acid will now be described in detail. The remarks apply equally to processes of concentrating other corrosive liquids and also to the separation of substance mixtures which contain at least one corrosive component. Dilute, impure acid at a concentration of 50 to 80% by weight, preferably about 60 to 75% by weight, is purified and concentrated in an apparatus according to FIG. 6. If the acid is initially more dilute, it may first be concentrated to a suitable initial concentration, for example by using the hot vapors from the heat exchanger 11. Any solid substances precipitated at this stage are filtered off. This preliminary concentration may, of course, also be carried out in any other conventional apparatus such as an immersion heater evaporator. Acids which have a concentration above 69% by weight are appropriately diluted before being fed into the evaporating column although preferably at least one distillation tray is arranged above the inlet as shown in FIG. 9 so that the acid concentration on this tray can be kept below 69% by weight by suitably adjusting the reflux ratio. The overflow of acid into the vapors leaving the column is thereby prevented. From the storage vessel 1 the acid is pumped by a feed pump 2 into the heat exchanger 3 in which it is heated to a temperature of about 140° to about 190° C by the hot concentrated acids leaving the evaporating stage 5. From the heat exchanger 3, the preheated acid enters the evaporating column 6 where it may be mixed with an auxiliary substance supplied from a storage vessel 7 by way of feed pump 8. The auxiliary substances used are e.g. defoaming agents or chemicals such as nitric acid to oxidize or reduce impurities in the acid and preferably convert them into a gaseous or solid state. To increase the purifying effect, the acids and auxiliary substances together may be circulated by the pump 6c under conditions of external energy supply (see FIGS. 7 and 8). On leaving the evaporating column 6, the acid is distributed over the distributor heat 6d to enter the evaporating pipe 5a of the evaporating stage 5 in the form of a falling film. If the evaporating pipe 5a has a diameter of about 150 to 400 mm, each evaporating element can yield, in a single passage through the apparatus, about 5 to 30 tons per day of an approximately 94% acid. Between the internal evaporating pipe 5a and jacket 5b is a first melt which has a very low melting point but at the same time does not have a significant vapor pressure at the boiling point of the acid which is required to be concentrated. The melts used are preferably metal melts, for example, a lead-bismuth alloy which melts at 120° to 125° C. The advantage of using a very low melting alloy is that if production is stopped at any time, the melt can be kept liquid simply by supplementary heating with steam or by applying steam to the evaporating pipe 5a. The evaporating pipe 5a is made of quartz, preferably with a purity of 99.9% of $SiO_2$. The quartz glass pipe 5a is fitted into the evaporating stage 5 mainly by its own weight and if necessary the weight of the evaporating column 6 attached to it so that the pipe is subjected only to pressure in the radial and axial directions. The lower part of the quartz pipe is preferably provided with a spherical extension ground or even with a plane ground over a large area to ensure it is efficiently sealed. The evaporating column 6 need not be directly attached to the evaporating pipe 5a (FIG. 7) but may be arranged laterally (FIG. 8). In that case, the parts connecting the column to the evaporating pipe are made of flexible material.

The evaporating pipe 5a is heated by the first melt 5c which in turn is heated by the second melt 5e situated between the internal jacket 5b and external jacket 5d. The melt 5e is preferably a salt with a melting point of 140° C to 160° C composed of 53% $KNO_3$, 44% $NaNO_3$ and 7% $NaNO_2$ although other melts may also be provided they have a low melting point and a negligible vapor pressure at the operating temperature and do not decompose. Futhermore, since for economical reasons the parts of the apparatus which come into contact with the melt are made of steel, the melt should not be corrosive. Apart from the melt described above, melts with melting points of about 25° C to 150° C based on bismuth and/or lead and/or gallium and/or tin and/or zinc may be used.

The quantity of heat required for concentrating the liquid is provided from the heating installation 15 from which the heating melt 5e is circulated. Fuel oil or natural gas 16 is burnt in the combustion apparatus 17, if possible together with the residue 14, i.e. if the emission limits allow. The heat produced is supplied to the melt circulating in the pipe system 18 and heats the melt to temperatures of from about 100° C to 550° C. The combustion gases give up part of their heat to the air of combustion in the heat exchanger 19.

A temperature gradient corresponding to the range of boiling points of the mixture of substances which are to be separated can be maintained in the external jacket 5d by regulating the flow velocity of the melt.

The sulfuric acid is concentrated to about 94 – 98.3% in the evaporating pipe 5a and cooled in the heat exchanger 3 and cooler 9. If necessary, a device for separating solids (crystallized salts) is arranged between the heat exchanger 3 and cooler 9. If necessary, the container 10 may also be equipped as a settling tank for solids. The deposition of salts during the concentration of the acid in the evaporating tube 5a is not harmful since, as special experiments have shown, the salts are continuously washed out and removed from the evaporating pipe together with the acid flowing through it.

The whole evaporating stage operates at approximately atmospheric pressure.

The installation may constantly be kept at a slight excess pressure by injecting inert gas at the inlet 20. Unforeseen explosive conditions in the evaporating pipe 5a due to a considerable pressure rise are immediately eliminated by the device 21 (safety valve).

The vapors produced by evaporation of the liquid (readily volatile fraction) leave the evaporating column 6 and are condensed in the heat exchanger 11 and transferred to the oil separator or solids separator 12. The condensate in the form of very pure water is removed from the plant at 13. Oils and other organic impurities which were contained in the vapors are tapped off at 14 and transported directly to the heating system 15 for combustion.

The process of invention is especially suitable for the treatment of liquid mixtures containing components with boiling points of above 200° C and most preferably above 250° C.

The invention will now be further described in the following illustrative examples.

EXAMPLE 1

An evaporating pipe of quartz glass (impurities 8 ppm) 200 mm in diameter and 5 m in length is installed in a plant similar in arrangement to that shown in FIG. 6. The rectifying column consisted of five bubble trays of quartzware (purity 98%) and of borosilicate glass.

400 kg per hour of 70% sulfuric acid were pumped by a piston feed pump to the top of the rectifying column by way of a heat exchanger. The sulfuric acid was contaminated with 2% of organic compounds, mainly mono- and dinitrotoluene. The temperature at which the acid entered the column was 100° C and the temperature at which the vapors left at the same point was 113° C. When the vapors were condensed and cooled to 25° C, aqueous and organic phases were obtained. The organic phase could be returned to the production process. The aqueous phase contained small quantities of sulfuric acid. The molten salt was heated to 460° C and it cooled to 400° C in the evaporating stage. Sulfuric acid was discharged from the evaporating unit at a concentration of 96% and a temperature of 314° C. It was mixed with cold acid in a mixing cooler, cooled to 25° C in coolers operated with trickling water and discharged from the installation.

EXAMPLE 2

Using the same installation as described in Example 1, the rate of input was adjusted to 225 kg per hour of 70% sulfuric acid. The quality of the acid was comparable to that in Example 1. The acid entered the rectifying column at 102° C, entered the evaporating pipe at 250° C and left the evaporating pipe at 323° C. The vapors formed by evaporation of the liquid left the evaporating unit at 290°C, left the rectifying column at 152° C and were discharged from the installation at 35° C. 0.5 to 1 volume percent of 65% nitric acid, based on the quantity of sulfuric acid fed into the process, was introduced into the feed tray of the evaporating unit. The salt melt entered the evaporating unit at a temperature of 445° C and left at 415° C. The acid concentrations were 73.9% $H_2SO_4$ on the first bubble tray, 76.1% on the second, 85.2% on the third, 95.6% on the fourth and 96.6% on the fifth. The completely concentrated acid has a concentration of 97.8% $H_2SO_4$. The carbon content, which was initially 1.2% C, dropped to 0.0004%.

EXAMPLE 3

Sulfuric acid obtained as by-product from a nitration process was worked up in an apparatus similar to that illustrated in FIG. 7. The initial concentration was 75% $H_2SO_4$. The rectifying column consisted of four quartz glass bubble trays. The temperature in the individual trays was 100° C on the first tray, 175° on the second, 240° C on the third and 318° C on fourth tray. The acid entered the rectifying column at 99° C and the evaporating pipe at 318° C. The temperature of the external wall of the evaporating pipe was 430° C. When the process of concentration was completed, the acid had a concentration of 98.2% $H_2SO_4$ and contained 0.0003% C, 0.034% $NO_2$ and 0.0028% Fe.

EXAMPLE 4

A 70% acid obtained as waste product was concentrated in a plant which operated as illustrated in FIG. 9. The rectifying column was in this case a packed column. The concentrated acid was circulated by a pump 22a. The quantity circulated in proportion to the quantity of products discharged was 3:1. The circulated acid and the final acid product had an acid concentration of 95.3% $H_2SO_4$. The acid was concentrated to 85% $H_2SO_4$ in the packed column. At the end of this stage it still contained small quantities of organic impurities. These residues were oxidized by the addition of 1 volume percent of 70% sulfuric acid, based on the original quantity of acid. The circulating acid was at a temperature of 280° C and the acid flowing from the packed column into the evaporating unit was at a temperature of 265° C. The vapors formed by evaporation of the liquid left the evaporating pipe at 307° C and the rectifying column at 110° C.

In all the examples given above the quantities of waste gas were very small. Only traces of $SO_2$ could be detected analytically. The major portion of waste gas consisted of carbon dioxide.

It will be appreciated that the instant specification and examples are set forth by way of illustration and not limitation, and that various modifications and changes may be made without departing from the spirit and scope of the present invention.

What is claimed is:

1. An apparatus for processing a corrosive liquid comprising first, second and third concentric upright tubes defining first, second and third concentric spaces, said first tube being made of heat resistant material inert relative to the corrosive liquid, means for passing said corrosive liquid in the form of a film over the wall of said first tube remote from said second space, a molten material in said second space, a further molten material in said third space, external heating means for said further molten material, and means for recirculating said further molten material in said third space and to said external heating means.

2. An apparatus according to claim 1, wherein said first tube is made of quartz.

3. An apparatus according to claim 1, including a rectifier communicating with and above said first tube, and a heat exchanger communicating with said rectifier remote from said first tube, whereby said corrosive liquid is first heated indirectly in said heat exchanger with vapors generated at said first tube, and said corrosive liquid is then put in direct countercurrent heat exchange with vapors generated at said first tube as said liquid moves downwardly toward said first tube.

4. An apparatus according to claim 1, including displacement bodies within said first tube, said corrosive liquid being supplied to the inside of said first tube so as to flow over its inside wall as well as over said displacement bodies.

* * * * *